United States Patent
Strandberg et al.

(10) Patent No.: US 8,351,558 B2
(45) Date of Patent: Jan. 8, 2013

(54) MULTIPHASE DIRECT RF FREQUENCY TO DIGITAL CONVERTER AND RELATED METHOD

(75) Inventors: Richard H. Strandberg, Fremont, CA (US); Paul Cheng-Po Liang, Santa Clara, CA (US)

(73) Assignee: Panasonic Corporation, Osaka (JP)

( * ) Notice: Subject to any disclaimer, the term of this patent is extended or adjusted under 35 U.S.C. 154(b) by 622 days.

(21) Appl. No.: 12/567,427

(22) Filed: Sep. 25, 2009

(65) Prior Publication Data
US 2011/0075755 A1    Mar. 31, 2011

(51) Int. Cl.
*H03D 3/00* (2006.01)
*H03D 3/24* (2006.01)
*G01R 25/00* (2006.01)
*H04L 7/04* (2006.01)

(52) U.S. Cl. ............ 375/354; 375/362; 375/373; 327/2; 327/8; 327/39; 327/44

(58) Field of Classification Search .................. 375/259, 375/285, 354, 355, 356, 357, 359, 360, 362, 375/363, 365, 366, 371–376; 327/2, 5, 3, 327/8, 28, 39, 44, 100, 105, 141, 144, 145, 327/146, 147, 149, 150, 153, 156
See application file for complete search history.

(56) References Cited

U.S. PATENT DOCUMENTS

| | | | |
|---|---|---|---|
| 7,528,664 B1 * | 5/2009 | Liang | 331/1 A |
| 2007/0253468 A1 * | 11/2007 | Pettersen et al. | 375/146 |
| 2010/0225361 A1 * | 9/2010 | Rhee et al. | 327/105 |

* cited by examiner

*Primary Examiner* — Sam K Ahn
*Assistant Examiner* — Linda Wong

(57) ABSTRACT

The disclosure provides an effective means for fine-resolution determination of the frequency content of an RF signal using low speed digital circuits. The disclosure relates to a method and apparatus for decomposing a high frequency RF signal into several low frequency signals or data streams without loss of any information and without the use of extraneous circuit components such as local oscillators, mixers or offset phase-locked loops. Single or multiple phase oscillator outputs are fed directly to a single or multiple direct RF frequency-to-digital (DrfDC) circuits. The front end of the DrfDC circuit decomposes a high frequency signal into several low frequency signals without loss of any information. The low frequency signals are processed by the back-end of the DrfDC and converted into digital data streams. The digital data streams are then combined and averaged to represent the frequency of the input RF signal.

29 Claims, 15 Drawing Sheets

MULTIPHASE DIRECT RF FREQUENCY TO DIGITAL CONVERTER AND RELATED METHOD

BACKGROUND

1. Field of the Invention

The disclosure relates to using multiphase conversion systems for decomposing a high frequency incoming signal. More specifically, the disclosure relates to a method and apparatus for decomposing a high frequency RF signal into several low frequency signals, or digital data streams, without loss of any information and without the use of extraneous circuit components such as local oscillators, mixers or offset phase-locked loops.

2. Description of Related Art

Many RF communication systems require converting an incoming RF signal into a digital representation of the signal for further processing. The signal processor must also detect the frequency and the phase of the incoming signal and produce another signal that has a fixed relationship to the phase and frequency of the incoming signal. In conventional signal processing, a mixer and an offset phase-locked loop ("PLL") are frequently used to down-convert the RF signal into a low frequency, or baseband, signal which is suitable for signal processing. A conventional down-converting process requires multiple processing elements which can consume an ever increasing portion of the circuit's footprint and can be otherwise inefficient.

As the size of electronic radio devices decreases, the need for smaller integrated chip ("IC") processors increases. High integration and low power consumption are usually keys to the success of future mobile communication ICs. Consequently, digital implementation is favored over conventional analog implementation as the latter provides a smaller footprint, lower power consumption and a higher signal-to-noise ratio.

Conventional approaches to down-converting a high frequency signal fall into two categories. The first type of implementation uses a mixer and a local oscillator ("LO") to convert the high frequency signal to a low frequency signal. This implementation is shown in FIG. 1, where high frequency input signal S is directed to phase detector 110. Phase detector 110 detects an initial signal phase and directs the signal S to low pass filter ("LPF") 120. The filtered signal is then directed to voltage-controlled oscillator ("VCO") 130. The voltage input to VCO 130 is not shown. The output of VCO 130 and local oscillator ("LO") 140 are directed to mixer 150. Mixer 150 convolves the two signals and directs the resulting signal to frequency-to-digital converter (FDC) 160. FDC 160 converts the convolved signal into a digital word. The digital word can represent the frequency information of the down-converted signal. The frequency information is used by phase/frequency detector 110 to iteratively determine the phase of input signal S. A drawback of the circuit of FIG. 1 is the need for a mixer 150 and a local oscillator 140 which cumulatively increase the circuit's footprint and render the process inefficient.

A second type of conventional down-converters implements a so-called "divide-by-N" algorithm. FIG. 2 schematically illustrates one such down-converting circuit. In FIG. 2, a frequency input signal S is directed to a phase detector 210. The signal is then directed to LPF 220. The resultant filtered signal is directed to VCO 230. The oscillating signal is then fed to the divide-by-N logic circuit 240, where the high frequency signal is reduced to a low frequency signal by implementing a divide-by-N algorithm. However, the circuitry and algorithm may degrade the signal-to-noise ratio ("SNR") by about $10 \log_{10}N$. The degraded SNR can adversely affect signal processing and speed. These problems are even more pronounced when dealing with a multiphase VCO system such as a rotary travelling wave oscillator ("RTWO").

Therefore, there is a need for an improved method and apparatus for decomposing a high frequency signal to one or more low frequency digital data streams without requiring extraneous circuit elements or degrading the SNR.

SUMMARY

In one embodiment, the disclosure relates to a method for decomposing a high frequency multiphase signal to one or more low frequency digital words. The method includes the steps of receiving the multiphase signal having a first phase and a second phase. The first phase is decomposed into a first alpha signal and a first beta signal. Similarly, the second phase of the incoming signal is decomposed into a second alpha signal and a second beta signal. The first alpha signal is processed at a first logic unit and the first beta signal is processed at a second logic unit such that the output of the first logic unit preserves a rising edge of the first phase and the second logic unit preserves a falling edge of the first phase of the multiphase signal. The second alpha signal is processed at a third logic unit and the second beta signal is processed at a fourth logic unit such that the third logic unit preserves a rising edge and the fourth logic unit preserves a falling edge of the second phase of the multiphase signal. The first, second, third and fourth output signals are then averaged and combined to form an output signal. The output signal contains all of the information contained in the high frequency multiphase signal while having a fraction of the frequency thereof.

In another embodiment, the disclosure relates to an apparatus for decomposing a high frequency multiphase signal to one or more low frequency data streams. The apparatus includes: a first single-to-differential unit for decomposing a first phase of the multiphase signal to a first alpha signal and a first beta signal; a second single-to-differential unit for decomposing a second phase of the multiphase signal to a second alpha signal and a second beta signal; a first logic unit for processing the first alpha signal to a first output signal, the first output signal preserving a rising edge of the first phase of the multiphase signal; a second logic unit for processing the first beta signal to a second output signal, the second output signal preserving a falling edge of the first phase of the multiphase signal; a third logic unit for processing the second alpha signal to a third output signal, the third output signal preserving a rising edge of the second phase of the multiphase signal; and a fourth logic unit for processing the second beta signal to a fourth output signal, the fourth output signal preserving a falling edge of the second phase of the multiphase signal. The first logic unit reduces frequency of the first output signal to a fraction of the first phase of the multiphase signal.

In still another embodiment, the disclosure relates to a signal conversion system for converting a high frequency incoming signal to a lower frequency digital word. The system includes: a plurality of decomposition circuits for respectively decomposing each of the plurality of phases of a multiphase signal into a plurality of low speed data streams; a circuit for synchronizing the plurality of low speed data streams with the pair of high frequency differential signals to form synchronized low speed data streams; a clock circuit for reclocking the low speed data streams; and a combiner circuit for combining the plurality of low speed data streams into an output signal. At least one of the plurality of the decomposition circuits may also include one or more circuit elements arranged in a multistage cascade for decomposing the high frequency incoming signal into a number of low speed data streams.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

In communication systems, it is important to convert RF signals into digital representations for digital signal processing. In conventional architectures, either the input RF signal or a set of divided-down RF signals is used. The present invention provides a direct RF-to-digital converter ("DrfDC") system which enables decomposing a high frequency signal output of a multiphase VCO, such as an RTWO, into a plurality of digital data streams for signal processing. The disclosed embodiments are particularly suitable for use in transceivers and portable electronics, including: mobile devices (e.g., telephones, PDAs, laptops, etc.), global positioning systems ("GPS"), and stationary or mobile transceivers.

In one embodiment, each of the multiple phases of a high frequency signal is processed through a DrfDC and the results are combined and averaged to produce a lower frequency digital word. The digital data streams (even when combined into one signal) retain all of the level change information carried by the high frequency signal. Whereas the conventional systems only capture the rising edge of the incoming signal, the present invention operates by capturing the rising and falling edges of the signal. Therefore, the present invention operates with no information loss. Significantly, the present invention does not require a local oscillator, a mixer or an offset PLL, which have been used in conventional systems to obtain the same results.

The present invention is particularly advantageous over the conventional systems because it does not require extraneous circuit elements such as local oscillators or mixers. Consequently, the required circuit footprint is substantially smaller than the conventional systems and the circuit can be implemented on an IC suitable for portable and/or handheld devices. Because the present invention does not require a local oscillator, a mixer or an offset PLL, it draws significantly less power than existing systems. Thus, if used in a portable device, the battery will last longer or can be reduced in size to accommodate a smaller design.

Another important advantage of the present invention over conventional systems is its ability to provide superior signal quality and maximize bandwidth use. While the conventional systems lose information as they reduce SNR, the disclosed embodiments retain all of the signal data while reducing the SNR. As a result, the invention is particularly suitable for use in devices requiring high signal fidelity, such as mobile telephones.

Figure 1:
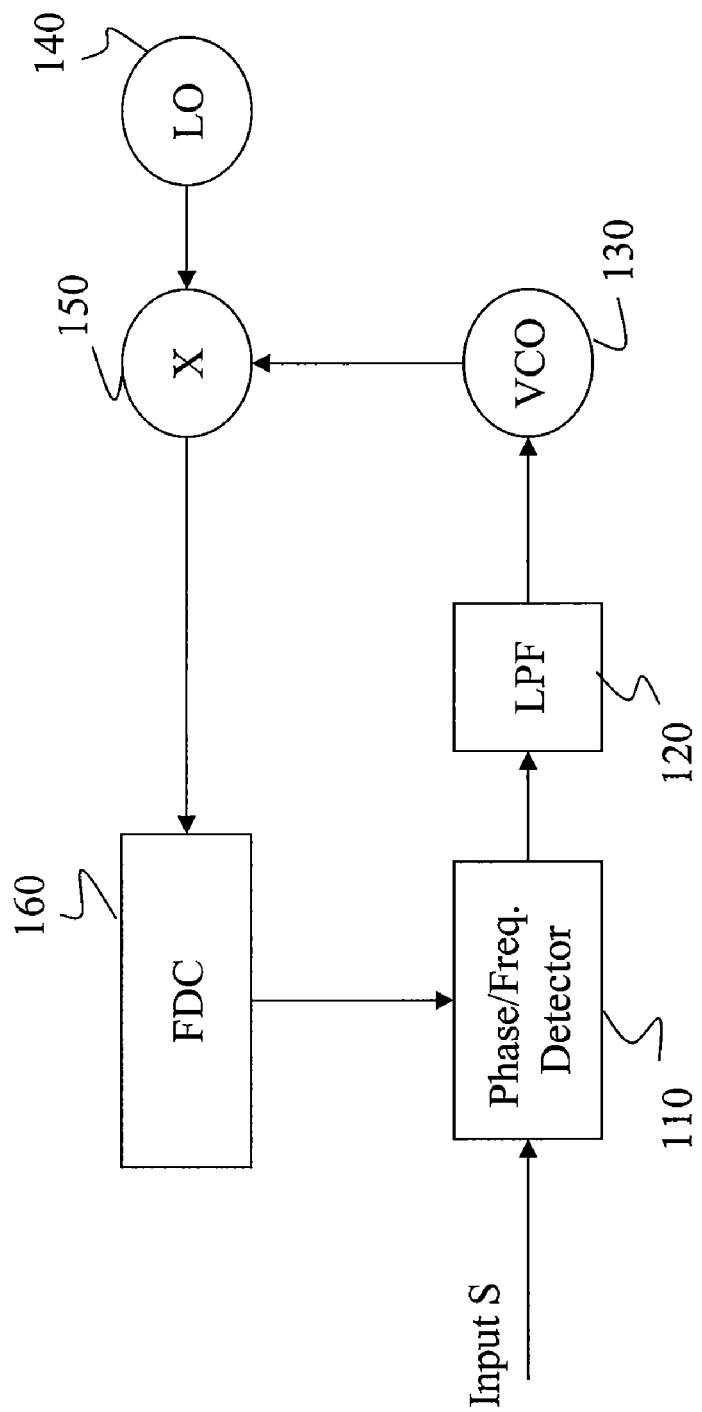
FIG. 1 shows a conventional down-converting circuit which requires a mixer and a local oscillator.
Figure 2:
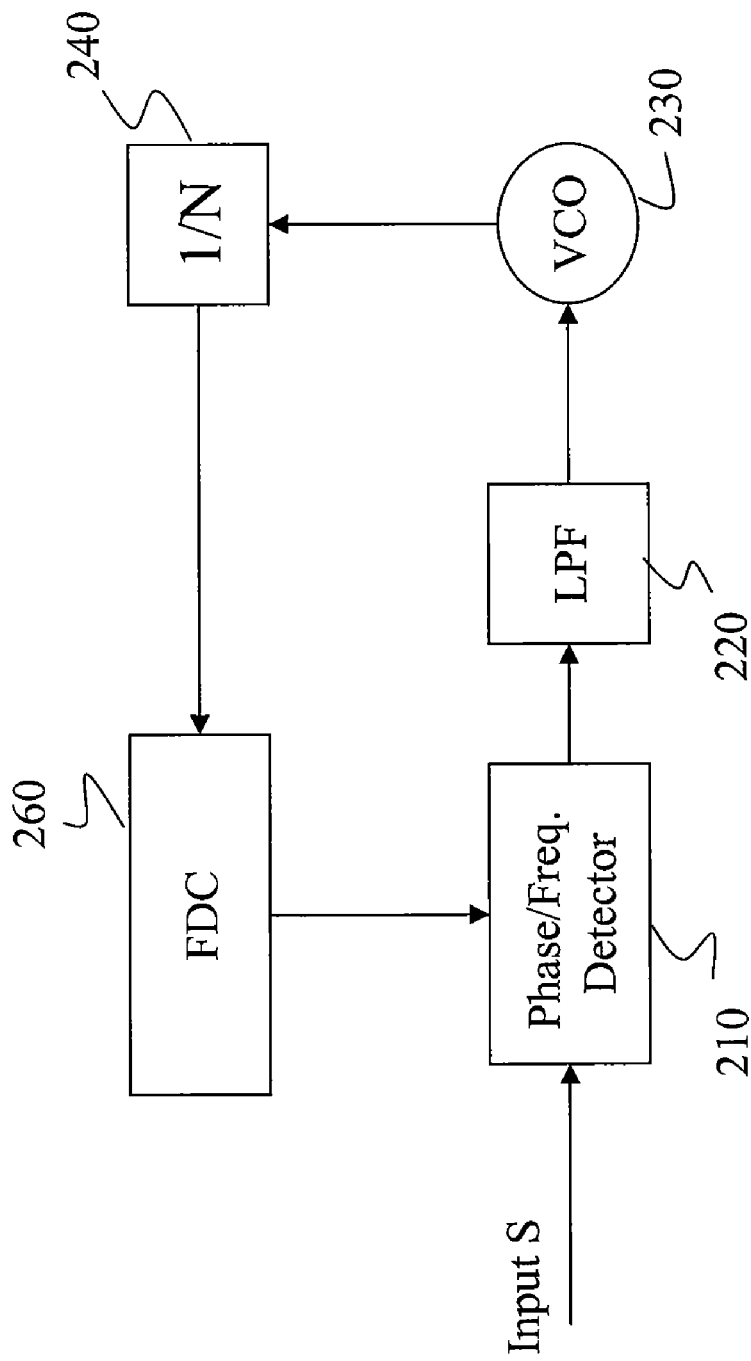
FIG. 2 shows a conventional down-converting circuit implementing the divide-by-N algorithm.
Figure 3B:
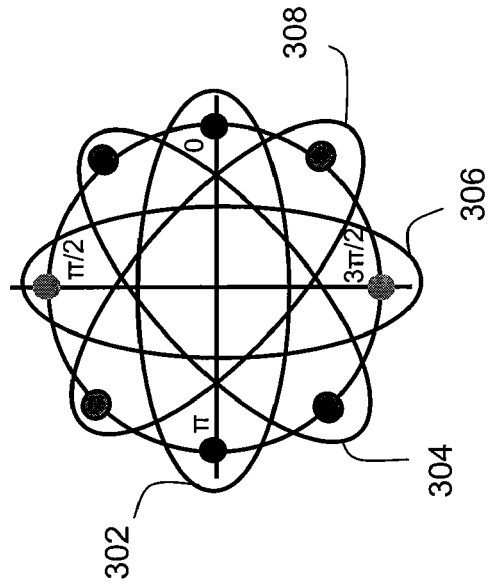
FIG. 3B is a phase transition diagram corresponding to the timing diagram of FIG. 3A.
Figure 3A:
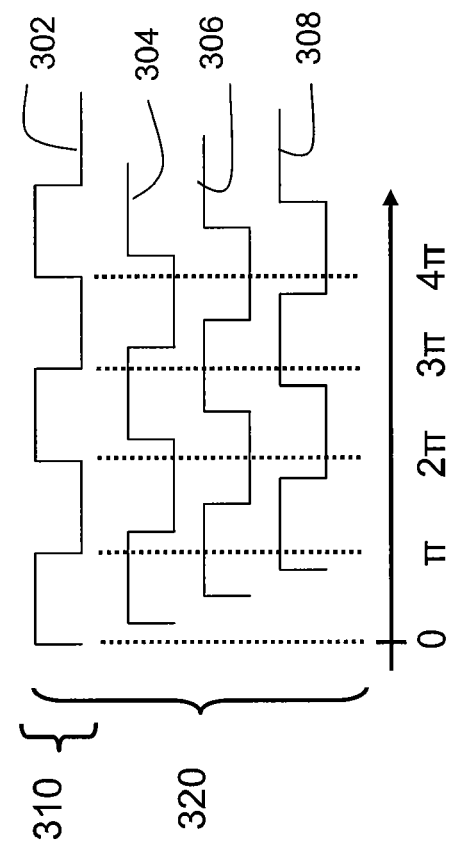
FIG. 3A is an exemplary timing diagram showing threshold output of a multiphase oscillator.

FIG. 3A is an exemplary timing diagram showing threshold output of a multiphase oscillator. Specifically, FIG. 3A shows the multiple phases of a high frequency multiphase RTWO. The timing diagram of FIG. 3A shows threshold outputs 302, 304, 306 and 308. Whereas a typical oscillator has a single output, a multiphase oscillator can have two, four or more outputs. The signal modulations are shown on the accompanying x-axis at various intervals of 0, $\pi$, $2\pi$, $3\pi$ and $4\pi$. Each distinctly different modulation present at various phases contributes to the overall RF representation. FIG. 3B is a phase transition diagram corresponding to the timing diagram of FIG. 3A. In FIG. 3B each of phase signals 302, 304, 306 and 308 are shown as shifted by approximately 45 degrees.

Figure 4:
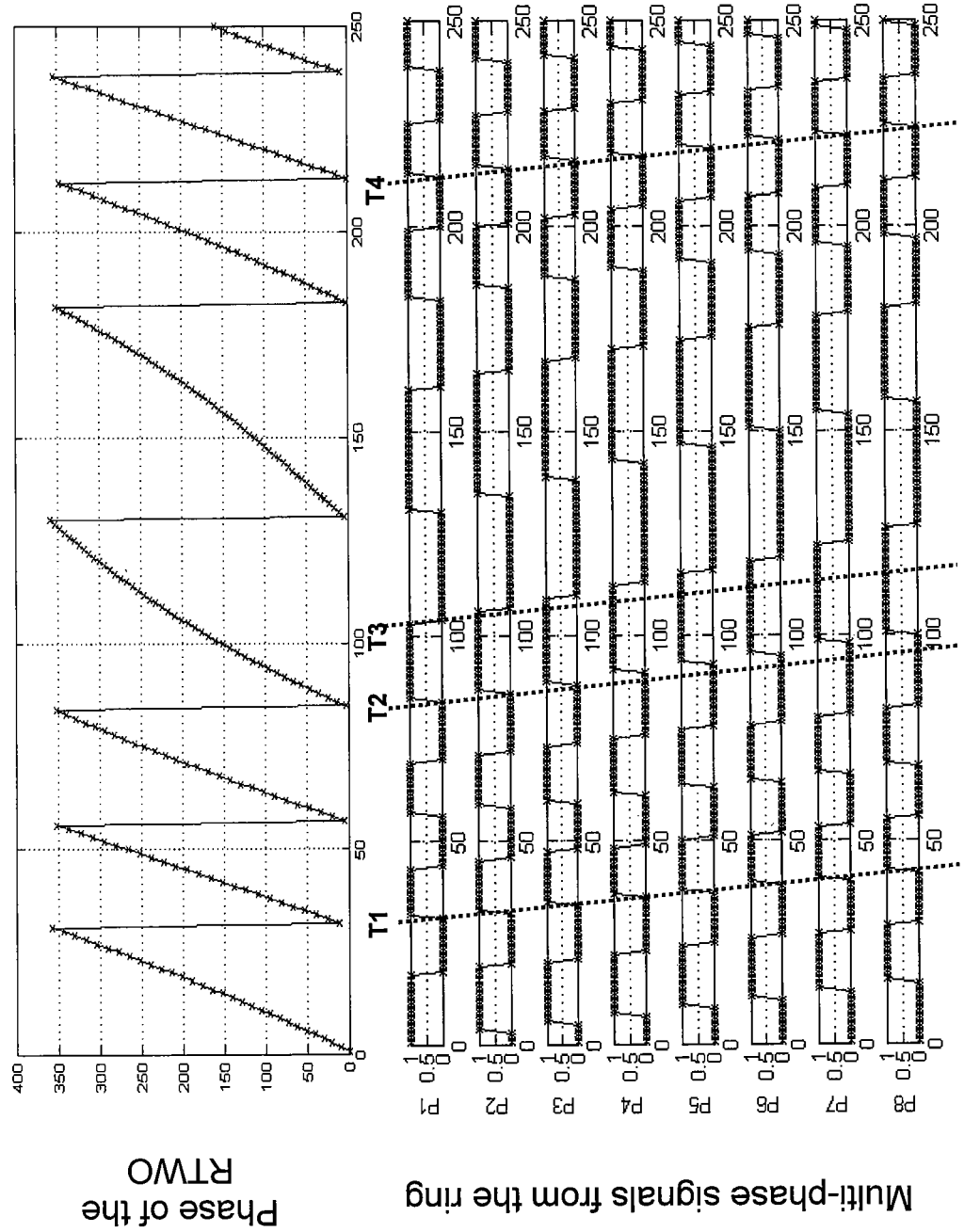
FIG. 4 shows multiple phases of modulated RF signal from an exemplary RTWO.

FIG. 4 shows multiple phases of modulated RF signal from an exemplary RTWO. The top diagram shows the phase of the RTWO and the bottom diagram shows the multiphase signal from the ring. The top and bottom diagrams are aligned to show phase changes along time intervals $T_1$, $T_2$, $T_3$ and $T_4$. At times $T_1$ and $T_4$, there appears little modulation on the RF signal and the phase outputs along the dashed $T_1$ appear as delayed versions of each other. However, during times $T_2$ and $T_3$ there is significant modulation on the RF signal, which indicates that the modulation of one phase is not simply a time delayed version of the signal as waveforms $P_1$ through $P_8$ are distinctly different in their proximity to lines $T_2$ and $T_3$. Larger deviations from simple delayed version show relatively high percentage of frequency modulation which indicates the relatively large bandwidth.

Figure 5:
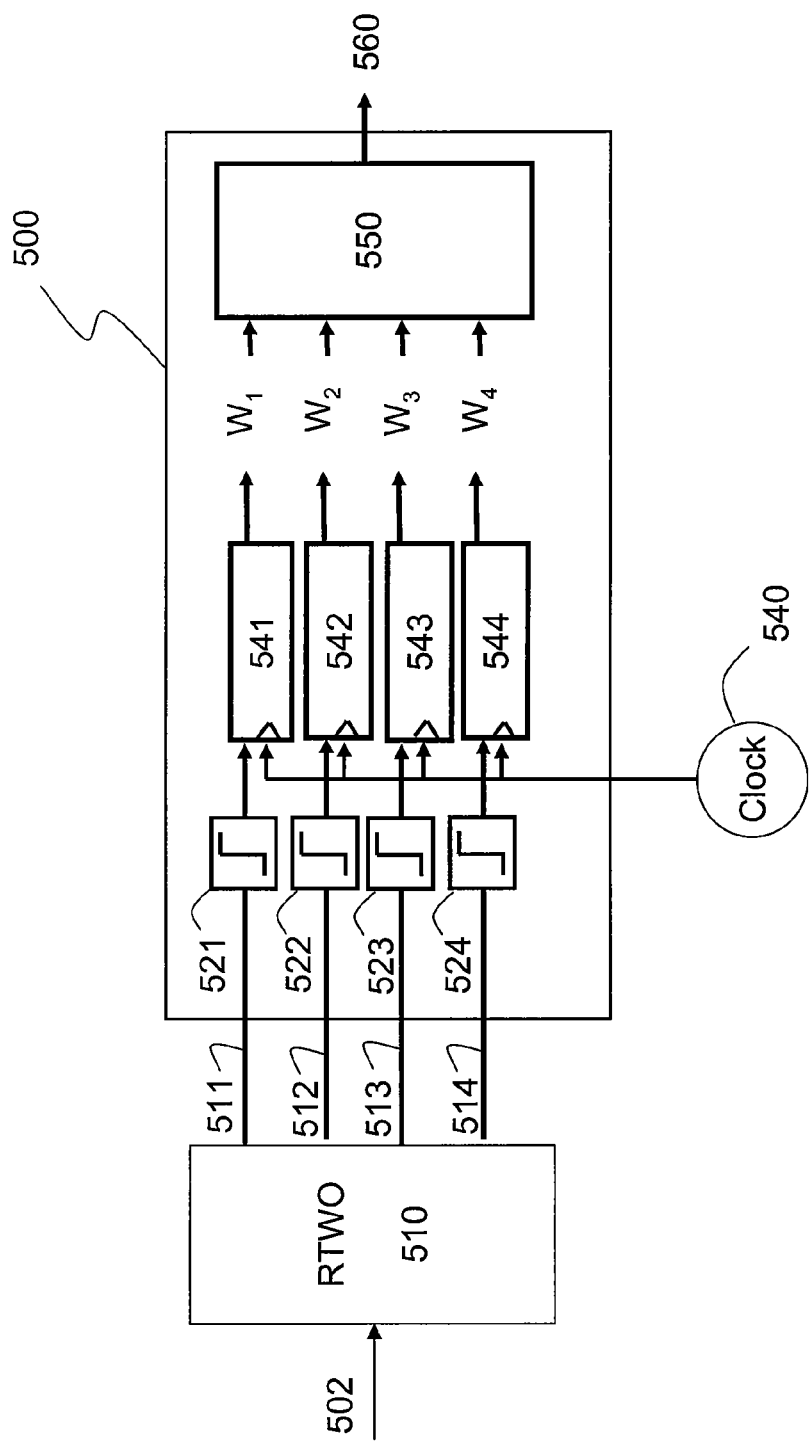
FIG. 5 is a schematic representation of an embodiment of the disclosure.

FIG. 5 is a schematic representation of a system according to an embodiment of the disclosure. In FIG. 5, input signal 502 is received by RTWO 510, which provides multiphase output signals 511, 512, 513 and 514 which are processed by the circuit 500 to produce digital word 560. Digital word 560 can define an RF signal at substantially lower frequency while containing the information transmitted by input signal 502. Signals 511, 512, 513 and 514 can correspond, for example, with $P_1$, $P_2$, $P_3$ and $P_4$ of FIG. 4. Each of signals 511, 512, 513 and 514 can be expressed as $S(t) \cdot e^{j\Theta(n)}$, where n identifies the phase number (i.e., 1, 2, 3 or 4).

Each of phase signals 511, 512, 513 and 514 is directed to one of the threshold detectors 521, 522, 523 and 524, respectively. The output from each of the threshold detectors, along with a clocking signal from clock 540, is directed to a DrfDC circuitry for processing. In the embodiment of FIG. 5, a DrfDC circuit corresponds to each phase signal output of the RTWO. Each DrfDC circuit produces a partial digital representation of RF signal 502.

As will be discussed in greater detail, each of the DrfDC circuits 541, 542, 543 and 544 comprises one or more processing circuits and logic units. Such circuits decompose a high frequency incoming signal to a plurality of low frequency output streams. The low frequency output streams are then combined into one low frequency data stream which represents the information contained in input signal 502. In the embodiment of FIG. 5, the output streams are represented as digital words $W_1$, $W_2$, $W_3$ and $W_4$, which correspond to DrfDC circuits 541, 542, 543 and 544.

The digital word outputs are directed to circuit 550. Circuit 550 combines and averages the digital words $W_1$, $W_2$, $W_3$ and $W_4$ to produce output signal 560. Output signal 560 is a lower frequency representation of input signal 502. In one embodiment, combiner circuit 550 comprises an adder and a lowpass filter. In another embodiment, a triangle filter can be used with taps at [1, ..., 8, ..., 1]. Summation may occur prior to the filtering step in order to reduce the circuit size. Phase alignment may not be needed as digital words $W_1$, $W_2$, $W_3$ and $W_4$ are equally weighted.

Output signal 560 is a low frequency representation of the information contained in input signal 502. According to the disclosed embodiments, the frequency of the output signal 560 can be a fraction of the frequency of input signal 502. For example, the output frequency can be one-half, one-quarter or one-eighth of the incoming frequency signal. As will be discussed below, the frequency of the output digital word is a function of the number of DrfDC circuits. Different DrfDC circuits can be designed according to the disclosure to provide different frequency output. Finally, while the circuit of FIG. 5 does not incorporate phase alignment, phase alignment circuits can be optionally added.

In the embodiment of FIG. 5, digital words or data streams $W_1$, $W_2$, $W_3$ and $W_4$ are combined. Combining the signals additively within one wavelength (or one clock cycle) leaves the frequency content unchanged. Waveform $S(t) \cdot e^{j\Theta(n)}$ going through DrfDC circuit produces the same digital representation of the input signal while having different noise components N. The noise component is a function of the DrfDC circuit. Thus, outputs of the DrfDC can be defined as follows:

$$W_1 \approx S(t) \cdot e^{j\Theta(1)} + N_1 \quad (1)$$

$$W_2 \approx S(t) \cdot e^{j\Theta(2)} + N_2 \quad (2)$$

$$W_3 \approx S(t) \cdot e^{j\Theta(3)} + N_3 \quad (3)$$

$$W_4 \approx S(t) \cdot e^{j\Theta(4)} + N_4 \quad (4)$$

Where $N_1$, $N_2$, $N_3$ and $N_4$, quantify the noise associated with a respective DrfDC circuit. If we assume the noise terms are statistically independent, the variance term ($\sigma^2$) decreases as the number of terms increases. Thus, if a statistically independent noise sources are added, the variance term is reduced by a factor of $\alpha$. For the four-phase system of FIG. 5, for example, an increase in the SNR can be expected to be about 6 dB (i.e., $10 \cdot \log_{10}(4)$).

Figure 6:
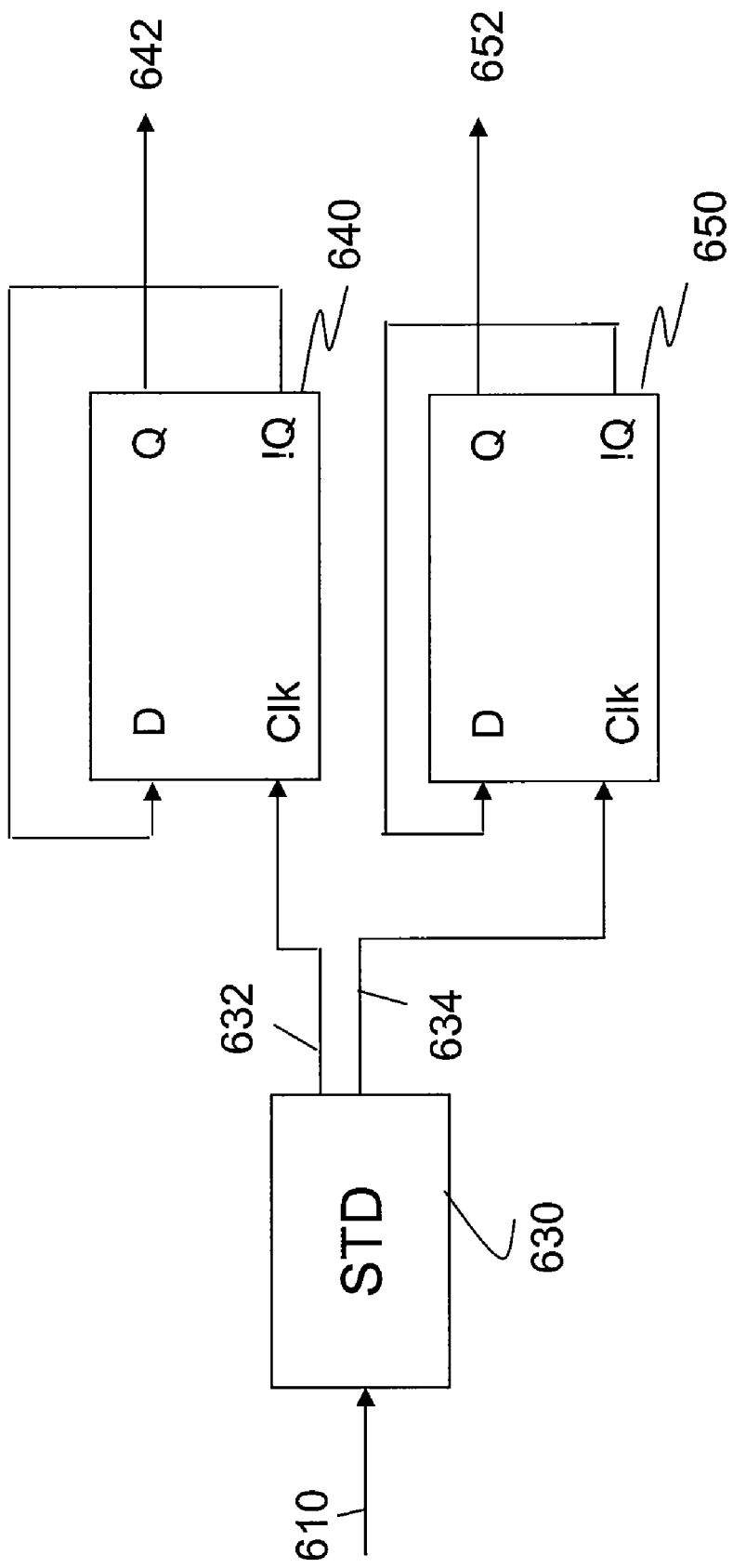
FIG. 6 describes the front end of a DrfDC circuit according to one embodiment of the disclosure.

FIG. 6 describes the front end of a DrfDC circuit according to one embodiment of the disclosure. In FIG. 6, input signal 610 can define a high frequency input signal which may be the output of a threshold detector (see FIG. 5). Any of the input signal 511 through 514 of FIG. 5 can be received at the front-end of an RF receiver. Input signal 610 is directed to a single-to-differential ("STD") circuit 630. STD circuit 630 can be any conventional circuit for generating two balanced output signals from one single-ended input signal. STD circuit 630 decomposes the incoming signal into a first signal 632 and a second signal 634. First signal 632 and second signal 634 can be substantially synchronous signals with opposite phases.

The first and the second signals are then processed through a plurality of logic units. In one embodiment, the logic units are defined by clocked or edge-triggered devices (i.e., devices having conceptual combination of a transparent-high latch with a transparent-low latch.) In a preferred embodiment, the logic unit defines a pulse-triggered, edge-triggered flip-flop or a shift register.

Referring to the illustrative embodiment of FIG. 6, flip-flops 640 and 650 receive first signal 632 and second signal 634, respectively. First output signal 642 and second output 652 define digital data streams with half of the frequency of input signal 610. When combined (not shown), first output signal 642 and second output signal 652 form a combined signal with about half of the speed of input signal 610 while containing all the information carried by the input signal.

Figure 7:
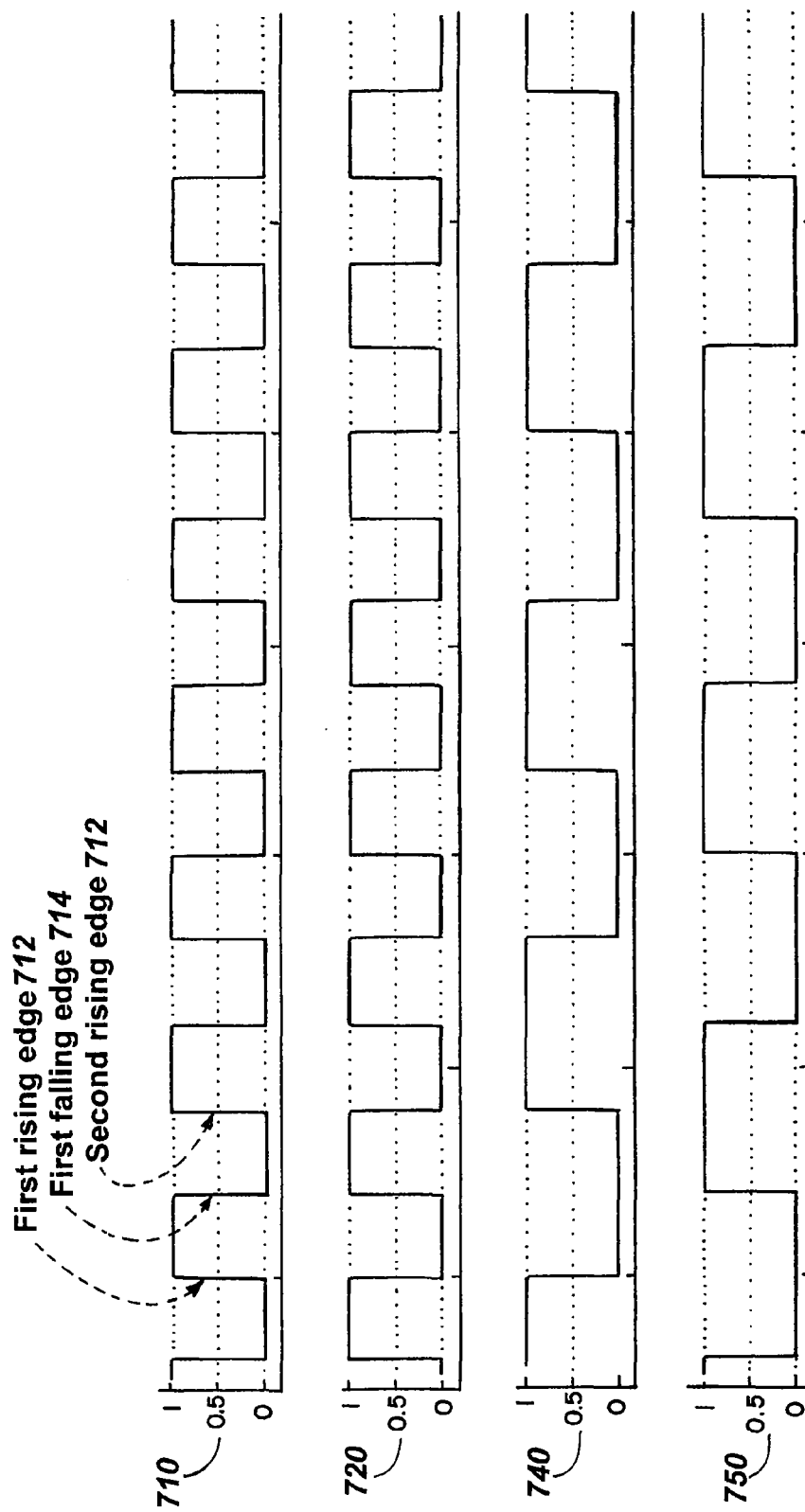
FIG. 7 demonstrates pulse trains processed by the circuit of FIG. 6.

FIG. 7 demonstrates pulse trains processed by the circuit of FIG. 6. In FIG. 7, signal pulse train 710 depicts first signal 632 of STD 630. Signal pulse train 720 depicts second signal 634 of STD 630. The first and second signals have substantially the same frequency as the incoming signal 610 of FIG. 6. It is evident from FIG. 7 that signal pulse trains 710 and 720 are substantially inverse of one another and that they are substantially synchronous with each other. First rising edge 712 of signal 710 is preserved in pulse train 740 which is output signal 642 (FIG. 6). Similarly, first falling edge 714 is preserved in pulse train 750 which is output signal 652 (FIG. 6).

Signal pulse train 740 preserves every other level change of first signal 710 (or second signal 634). Similarly, signal pulse train 750 preserves every other level change in first differential signal 710 (or second signal 634). Consequently, signal pulse trains 740 and 750 have a frequency of about half of that of first signal 632 or second signal 634 while capturing all of the transition information conveyed by the original signal. Thus, the circuit of FIG. 6 decomposes a high frequency signal into two slower digital streams while preserving all the transition information of the input signal.

In another embodiment of the invention, a circuit may be devised to preserve every other rising edge or falling edge of the differential signal. In still another embodiment, one out of every several rising edges can be preserved to further slow the speed of the incoming signal.

Figure 8:
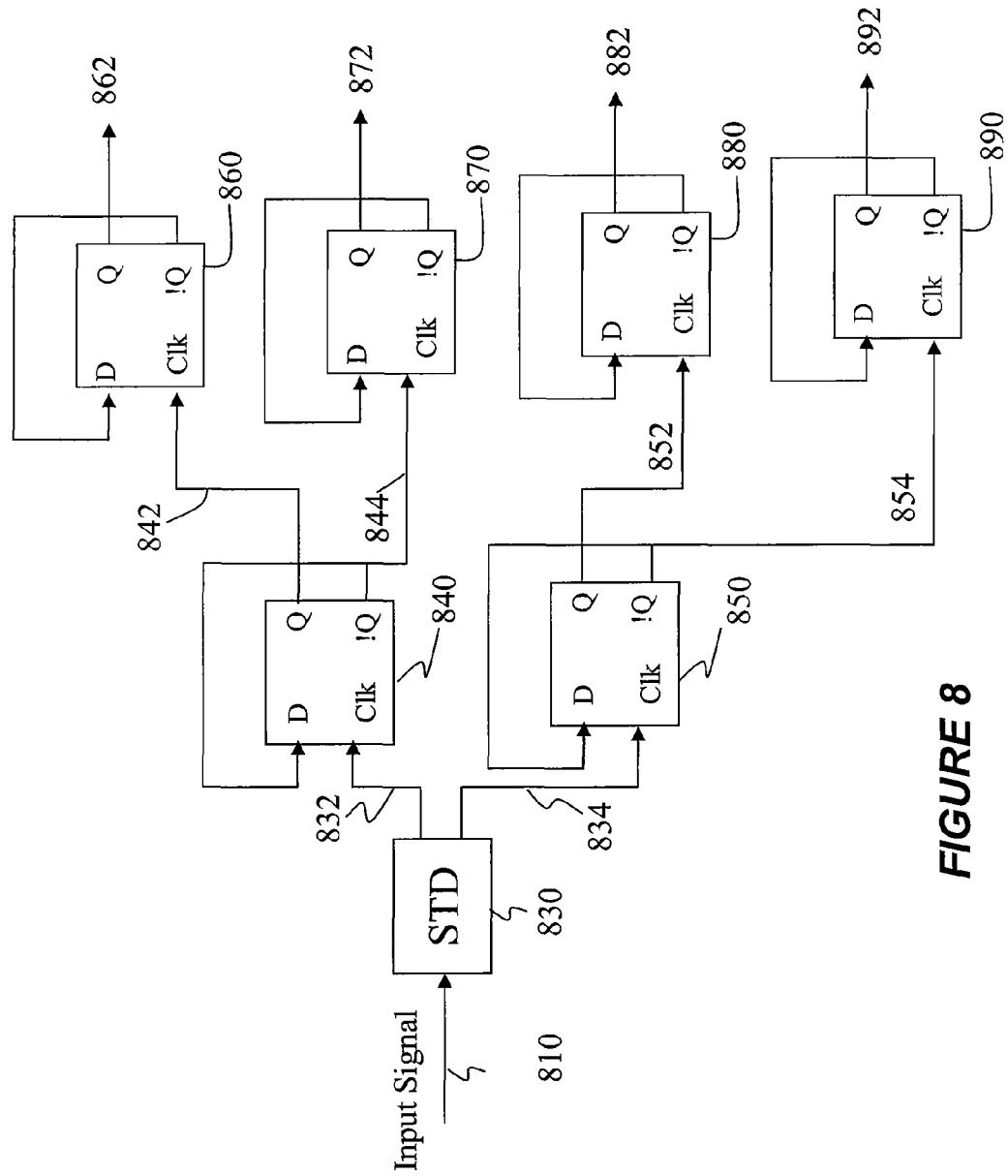
FIG. 8 is a multistage cascading DrfDC circuit for decomposing a high frequency signal into a plurality of slow-speed digital data streams.

FIG. 8 is a multistage cascading DrfDC circuit for decomposing a high frequency signal into a plurality of slow-speed digital data streams. In FIG. 8, input signal 810 is provided as input RF signal to STD circuit 830. Input signal 810 can be optionally processed through a limiter or a threshold detector as shown in FIG. 5. STD circuit 830 directs first signal 832 and second signal 834 to first logic unit 840 and second logic unit 850, respectively. First output signal 842 is directed to third logic unit 860 and second output signal 844 is directed to fourth logic unit 870. As evident in FIG. 8, the multistage cascading circuit decomposes the signal without requiring a mixer or a local oscillator.

First logic unit 840 and second logic unit 850 define the first stage of the multistage cascading circuit. As will be demonstrated with reference to FIG. 9, the first stage can provide digital data streams having about half of the speed of the original signal. The digital data streams contain all of the transition information of input signal 810.

Logic units 860, 870, 880 and 890 define the second stage of the cascading circuit. Logic units 860, 870, 880 and 890 receive digital data streams 842, 844, 852 and 854, respectively, from the first stage and further reduce the speed and frequency of the received data streams. Outputs 862, 872, 882 and 892 define digital data streams which cumulatively contain all of the original data contained in the input signal. Each of outputs 862, 872, 882 and 892 has a signal speed of about one-fourth of input signal 810.

Figure 9:
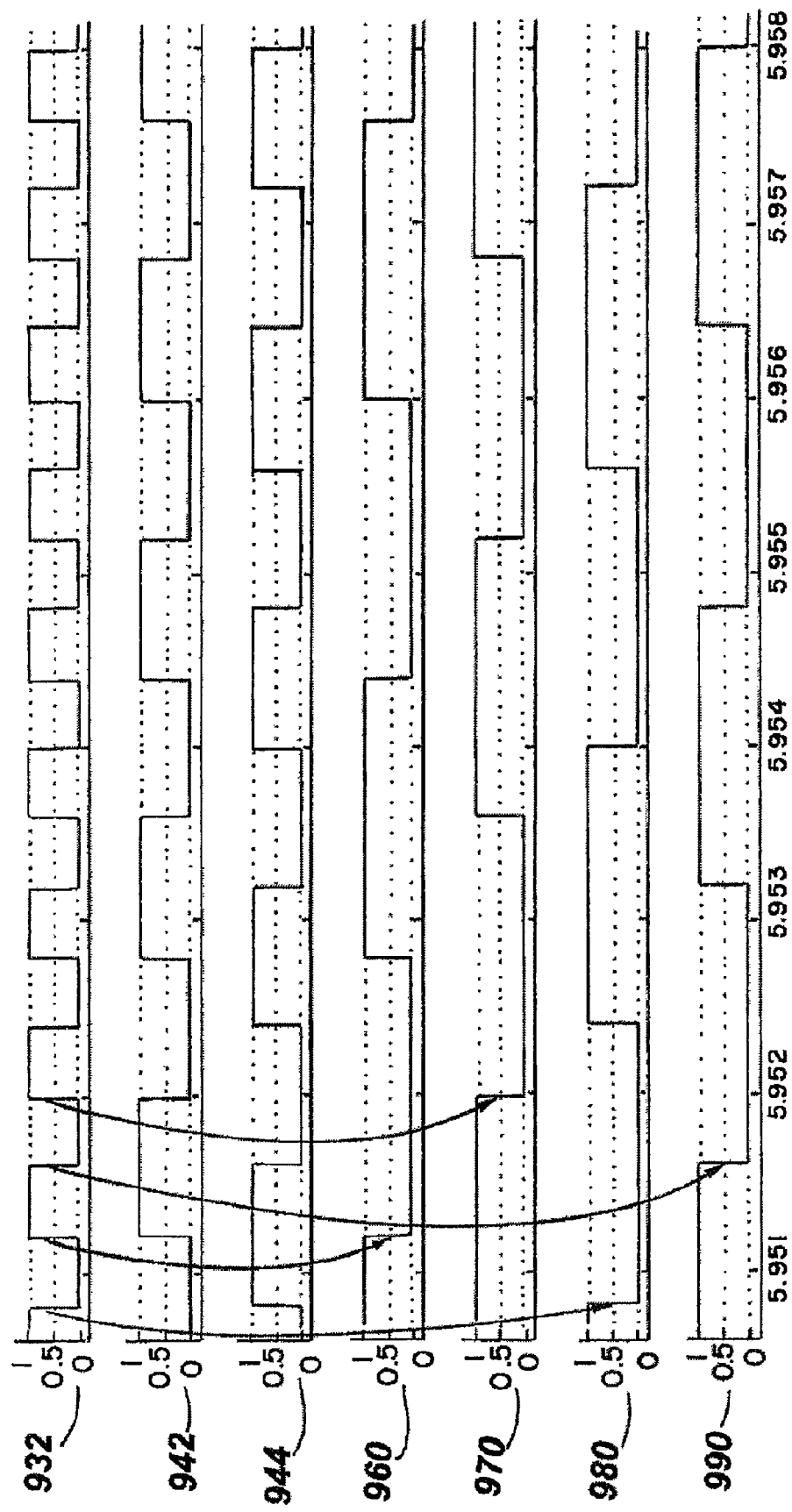
FIG. 9 illustrates the timing diagram output for the circuit of FIG. 8.

FIG. 9 illustrates the frequency response at each stage of the cascading circuit of FIG. 8. Referring to FIGS. 8 and 9 simultaneously, pulse train 932 depicts first signal 832 from STD circuit 830 of FIG. 8. Pulse trains 942 and 944 depict signal outputs 842 and 852, respectively. In other words, pulse train 942 is the output of first logic unit 840. As is evident from FIG. 9, pulse train 942 preserves the rising edge of pulse train 932. That is, every time there is a rise in pulse train 932, signal 942 switches from one state to another. Similarly, pulse train 944 preserves the falling edge of pulse train 932 and every time there is a fall in pulse train 932, signal 944 switches from one state to another. Signal pulse trains 942 and 944 are at about half of the frequency of signal 932 or, put differently, signal output from first logic unit 840 is at half the speed of the input signal.

Signal trains 960, 970, 980 and 990 are the outputs of logic units 860, 870, 880 and 890, respectively. Pulse train 960 preserves the rising edge of signal 942 while pulse train 970 preserves the falling edge of signal 942. Similarly, pulse train 980 preserves the rising edge of signal 944 while pulse train 990 preserves the falling edge of signal 944. It is evident from FIG. 9 that output signals from the second stage logic units are about half of the frequency of that of the first stage's output signal or about one-fourth of the frequency of its input signal.

In FIG. 8, the first stage of the multistage circuit includes two logic elements, while the second stage includes four logic elements. If x defines the number of logic elements at each stage, the relationship between the input signal's frequency ($F_{in}$) and output frequency at each stage ($F_{out}$) can be summarized as:

$$F_{out} = (1/x) F_{in} \quad (5)$$

That is, the output frequency of each stage will be inversely proportional to the input frequency of each stage. The frequency relationship is also a function of the number of logic elements at each stage. Accordingly, the frequency of output signal 844 is about half (x=2, for the first stage) of the input frequency of the input signal (see FIG. 8). Similarly, the frequency of output signal 862 is about one-fourth (x=4, for the second stage) of the input frequency of the input signal.

In one embodiment of the disclosure, a multi-stage device can be constructed to have n stages, in which the number of logic units is determined by the relationship:

$$\text{Total Number of logic units} = \sum_{i=1}^{n} 2^i. \quad (6)$$

Thus, an exemplary device having 3 stages (n=3) would have 14 logic units and a device having five (n=5) stages would have 62 logic devices. The logic devices can be laid out in the multistage, cascade-type, architecture.

Figure 10:
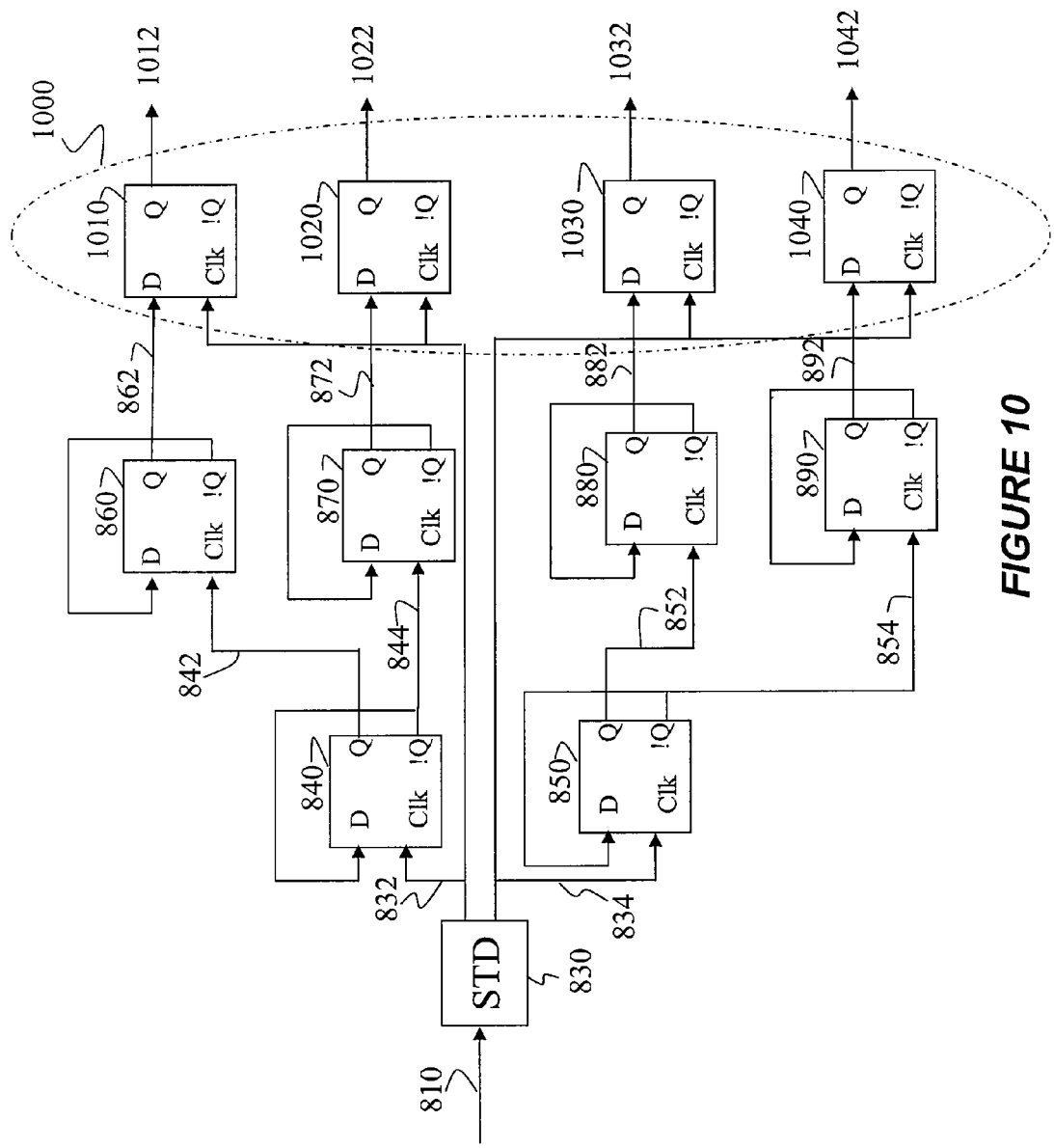
FIG. 10 illustrates a DrfDC circuit with a reclocking circuit according to an embodiment of the disclosure.

FIG. 10 illustrates a DrfDC circuit with a reclocking circuit according to an embodiment of the disclosure. Specifically, FIG. 10 shows the multistage cascade circuit of FIG. 8 (using the same reference numbers) and reclocking circuit 1000. Reclocking circuit 1000 includes logic elements 1010, 1020, 1030 and 1040. In the embodiment of FIG. 10, flip-flops are used as logic elements. Logic elements 1010, 1020, 1030 and 1040 receive input signals 862, 872, 882 and 892, respectively, and reclock the inputs with one of first or second differential signals 832 or 834. Reclocking the slow speed data streams 862, 872, 882 and 892 with their corresponding original signals 832 and 834 eliminates accumulated clock jitter from the multistage cascading circuit.

Clock jitter is the time variation of a characteristic of a periodic signal in electronics and telecommunications. Clock jitter does not usually change the physical content of the information being transmitted. Instead, the time at which the information is delivered is disturbed. Clock jitter can be observed in the frequency of successive pulses, the signal amplitude, or phase of periodic signals. Clock jitter can be significant and is an undesired factor in the design of communication links.

Output signals 1012, 1022, 1032 and 1042 of FIG. 10 define low speed digital data streams. The low speed digital streams contain the data carried by the input signal 810. As such, digital data streams 1012, 1022, 1032 and 1042 can be clocked to reference signal and processed through various logic circuits to extract the level change information from the low speed data streams. The circuit of FIG. 10 may additionally include a summer or an averager (not shown) to add outputs 1012, 1022, 1032 and 1042 and form a single output stream (not shown).

The circuit of FIG. 10 can define a DrfDC unit. Multiple DrfDC circuits can be configured to process a multiphase signal as a multiphase DrfDC ("MDrfDC") system. Thus, with reference to FIG. 5, each of the DrfDC circuits 541, 542, 543 and 544 can receive a phase of a multiphase, high frequency signal and produce a digital representation that changes at a desired rate.

Figure 11:
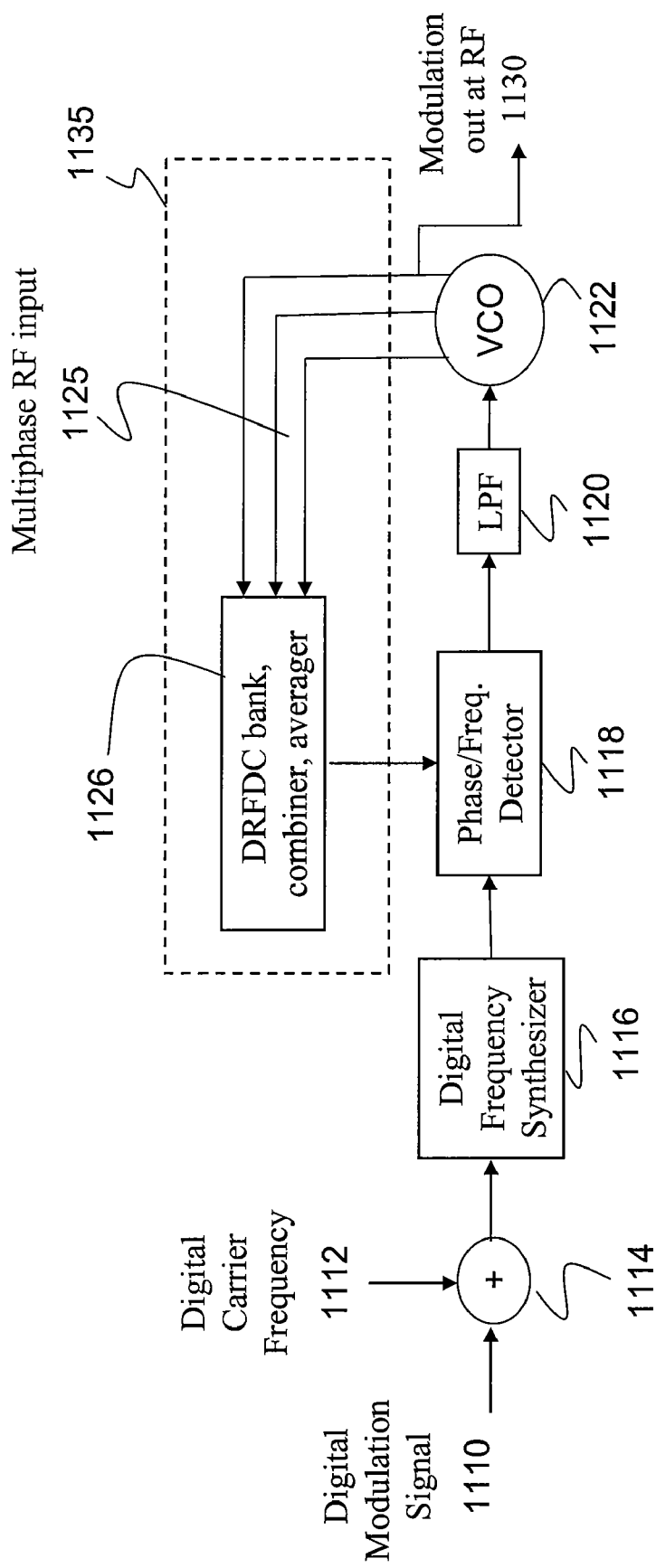
FIG. 11 is a schematic illustration of a frequency synthesizer using multiphase DrfDC circuitry according to another embodiment of the disclosure.

FIG. 11 is a schematic illustration of a frequency synthesizer using multiphase DrfDC circuitry according to another embodiment of the disclosure. In FIG. 11, digital modulation signal 1110 is combined with digital carrier frequency 1112 at modulator 1114 and the resulting signal is processed through digital frequency synthesizer 1116. Frequency synthesizer 1116 can be any conventional synthesizer circuit for generating any of a range of frequencies from an oscillator. In one embodiment, frequency synthesizer 1116 is a digiphase synthesizer.

The output of digital frequency synthesizer 1116 is a reference phase and is directed to a phase/frequency detector 1118. In one embodiment, frequency detector 1118 defines a phase frequency detector which receives and compares the incoming signal's frequency with a measured frequency. The result is directed to low-pass filter 1120 which drives VCO 1122. VCO 1122 may comprise a multiphase VCO. DrfDC bank 1126 may include a DrfDC circuit corresponding to each of the multiphase signals stemming from multiphase VCO 1122. DrfDC bank 1126 may also include combiner and averaging circuits.

Output signal 1125 of VCO 1122 can define several different signals each signifying a different phase. Directing signal 1125 to multiphase DrfDC ("MDrfDC") 1135 allows measuring the frequency of the signal according to the disclosed embodiments and iteratively locking into the proper signal frequency. Each DrfDC circuit of MDrfDC 1135 may include a multistage cascading circuit consistent with the principles disclosed herein. Each DrfDC circuit may optionally include combiner and averaging circuits. Output 1130 is one of the many possible phase outputs of VCO 1122.

Figure 12:
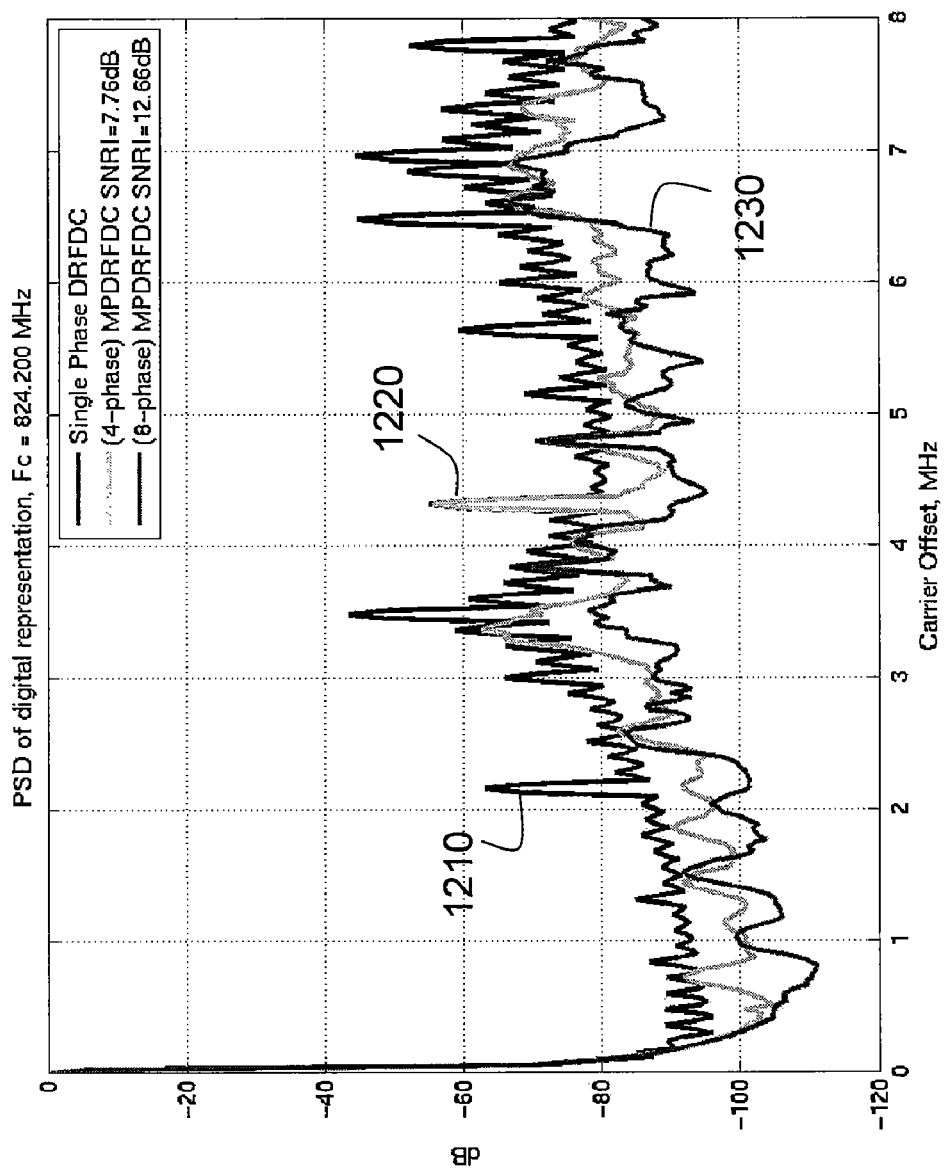
FIG. 12 is the test result showing SNR improvement from implementing the disclosed principles.

FIG. 12 shows the test results showing increases in SNR using the principles disclosed herein. Specifically, three different circuits were tested using the disclosed principles with a GSM band. The first circuit applied a single-phase DrfDC circuit to the output of a single-phase VCO having a center frequency of 824.2 MHz. The SNR for the single-phase DrfDC is depicted by line 1210. The experiment was repeated with a four-phase and an eight-phase RTWO. The SNR for the four-phase system improved by about 6 dB as depicted by line 1220. The SNR for the eight-phase system improved by about 12 dB as depicted by line 1230. The number of taps in the RTWO design can be increased to 256 or more, thereby improving the SNR even further. The SNR improvement is particularly suitable for mid- to high-bandwidth applications.

Figure 13:
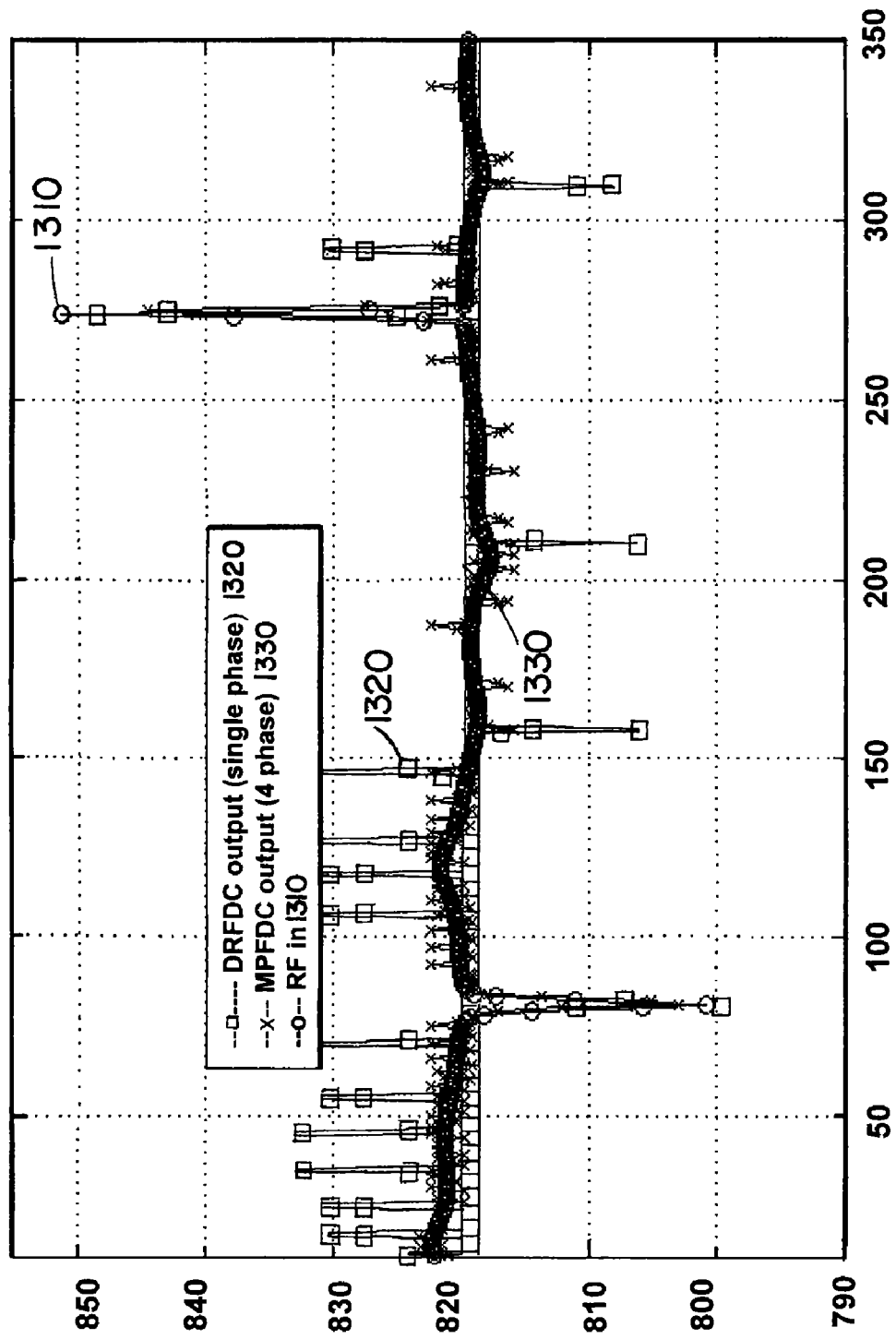
FIG. 13 is the test result for comparative signal tracking by different DrfDC systems.

FIG. 13 shows comparative signal tracking by different DrfDC systems. In FIG. 13, the input signal is depicted as 1310. Again, an 850 MHz GSM band was used ($F_c$=820 MHz). The reference clock was set at 491.52 MHz. A convolutional filter was used ([1.4.1],[1.4.1]), followed by averaging. The input signal is depicted as 1310. The signal output of a system having a single-phase DrfDC circuit is depicted as 1320, and an MDrfDC system is depicted as 1330. It is evident from FIG. 13 that the MDrfDC system tracked the input signal more closely than the single-phase DrfDC.

Figure 14:
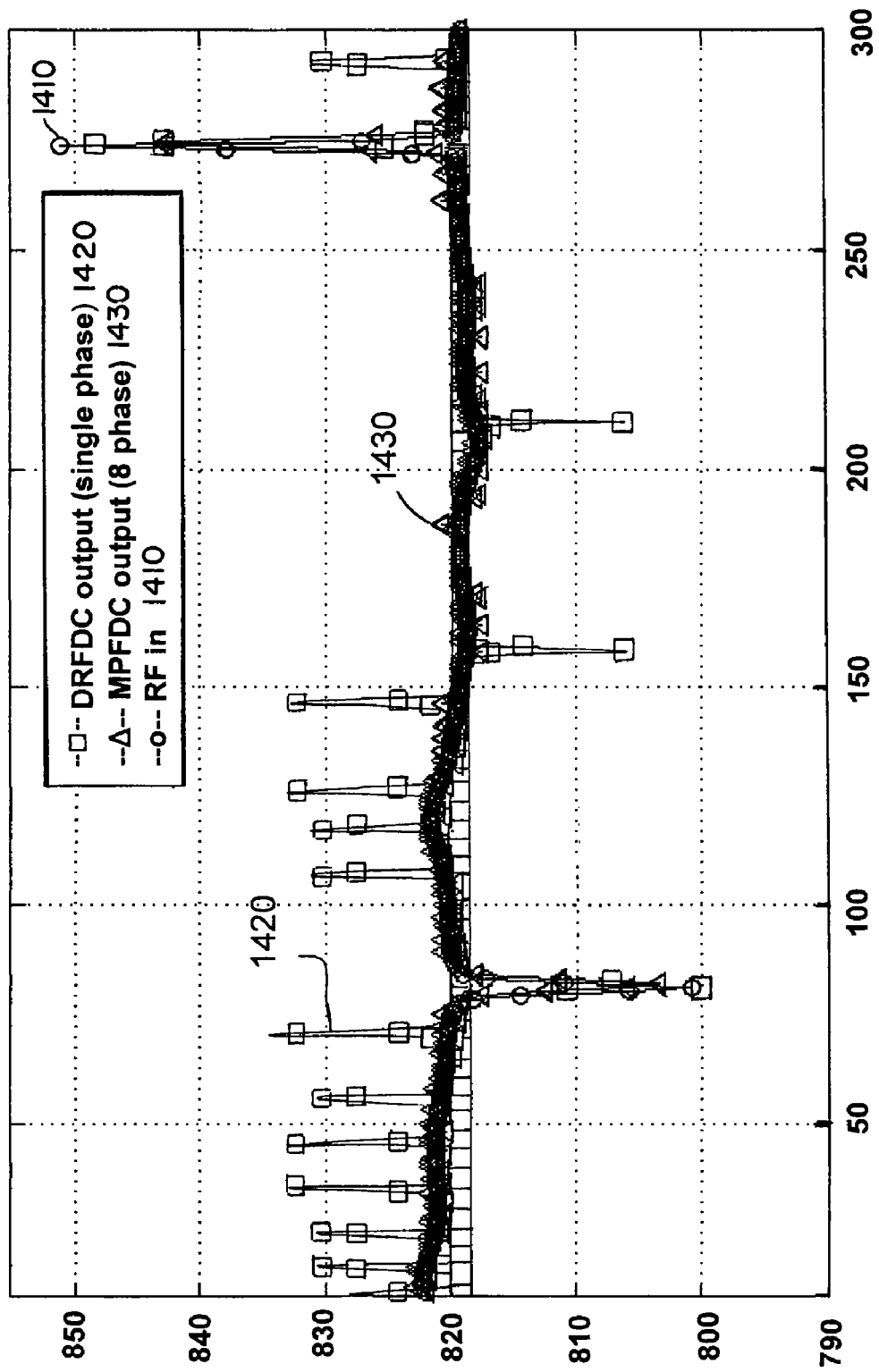
FIG. 14 is the test result for comparative signal tracking by an eight-phase DrfDC system.

FIG. 14 shows comparative signal tracking by an eight-phase MDrfDC system. More specifically, FIG. 14 shows comparative signal tracking by an eight-phase MDrfDC and a single-phase DrfDC system. FIG. 14 uses the same telecommunications parameters as FIG. 14. Here, the input channel is depicted as 1410, the single-phase DrfDC system is depicted as 1420 and the eight-phase MDrfDC is depicted as 1430. It is evident from FIG. 14 that the eight-phase MDrfDC tracks the input signal closer than the single-phase DrfDC. The test results indicate that using a multiphase oscillator along with the disclosed embodiments can provide several distinct advantages, including improving the SNR and closely tracking the input RF signal.

Figure 15:
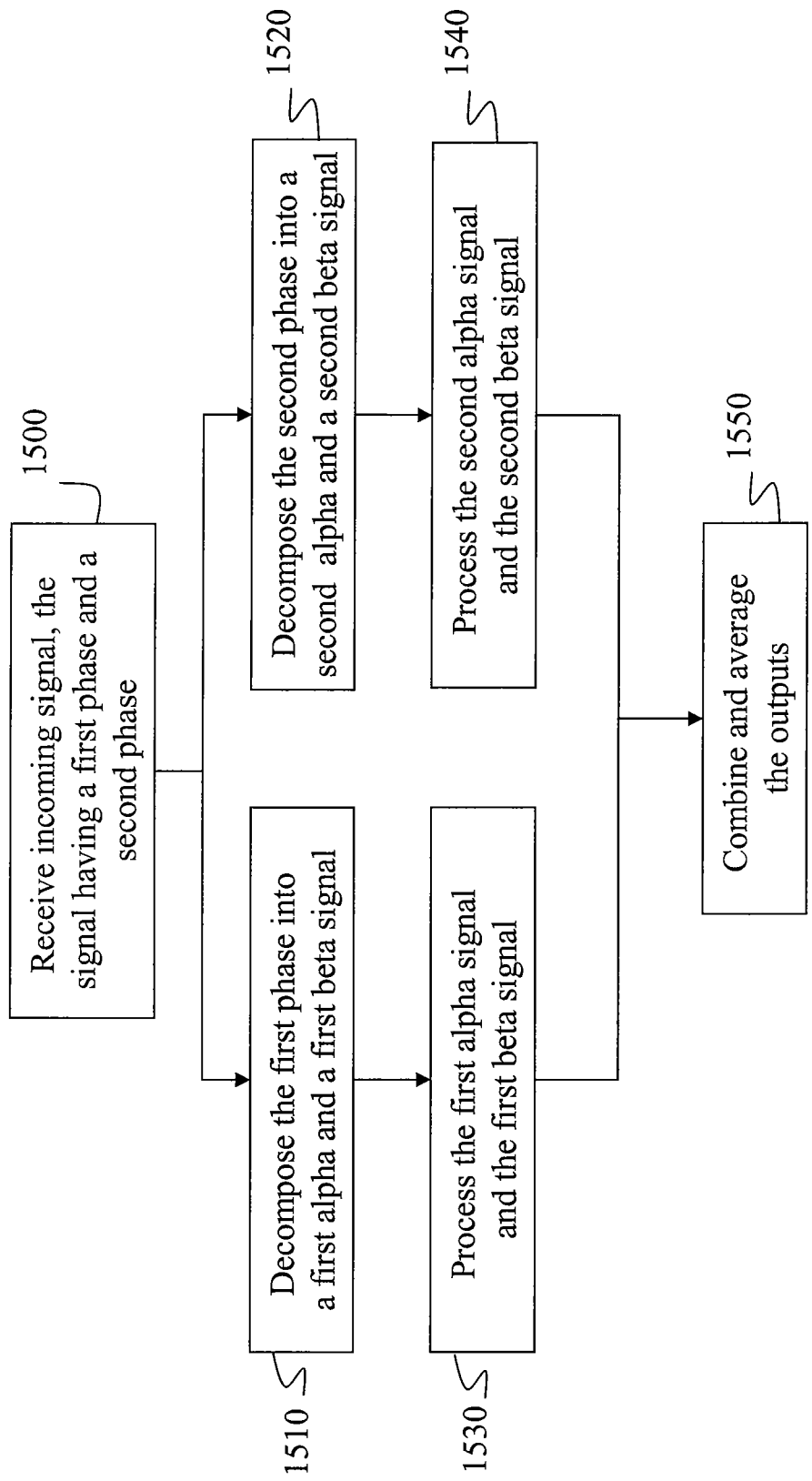
FIG. 15 is a flow-diagram showing a method for implementing an embodiment of the invention.

FIG. 15 is a flow-diagram showing a method for implementing an embodiment of the invention. In step 1500, a high frequency multiphase incoming signal is received. For brevity, it is assumed that the signal has two phases. In steps 1510 and 1520, each of the first phase and the second phase of the multiphase signal is decomposed. That is, the first phase is decomposed to a first alpha signal and a first beta signal and the second phase is decomposed to a second alpha signal and a second beta signal. The first alpha signal and the first beta signal can be substantially inverse signals of each other. Steps 1510 and 1520 can be implemented simultaneously or sequentially.

In step 1530, the first alpha signal and the first beta signal are processed, for example, through one or more DrfDC circuits to provide a first output signal and a second output signal. The second alpha signal and the second beta signal are processed at step 1540 to provide a third output signal and a fourth output signal. Steps 1530 and 1540 can be implemented simultaneously or sequentially.

The output signals from steps 1530 and 1540 (i.e., the first, second, third and fourth output signals) are combined and averaged at step 1550 to provide a final output signal. The final output signal represents the incoming signal (see step 1500) while retaining all of the information carried therein.

It is noted that while the exemplary embodiments presented herein describe four equally-spaced phases of an RF signal, the disclosed principles are not limited thereto and can be used with oscillator devices having more or fewer than four phases. Further, although the principles of the disclosure have been illustrated in relation to the exemplary embodiments shown herein, the principles of the disclosure are not limited to the exemplary embodiments and include any modification, variation or permutation thereof.

What is claimed is:

1. A method for decomposing a high frequency multiphase signal to one or more low frequency digital words, the method comprising:
   receiving an incoming signal, the signal having a first phase and a second phase;
   decomposing the first phase of the incoming signal into a first alpha signal and a first beta signal;
   decomposing the second phase of the incoming signal into a second alpha signal and a second beta signal;
   processing the first alpha signal at a first logic unit to provide a first output signal, the first output signal preserving a rising edge of the first phase signal;
   processing the first beta signal at a second logic unit to provide a second output signal, the second output signal preserving a falling edge of the first phase signal;
   processing the second alpha signal at a third logic unit to provide a third output signal, the third output signal preserving a rising edge of the second phase signals;
   processing the second beta signal at a fourth logic unit to provide a fourth output signal, the fourth output signal preserving a falling edge of the second phase signal; and
   combining the first output signal with the second, third and fourth output signals to form a combined signal;
   wherein the combined signal has a frequency which is a fraction of the incoming signal frequency.

2. The method of claim 1, wherein the first alpha signal is a substantial inverse of the first beta signal.

3. The method of claim 1, wherein the frequency of the combined signal is about one-quarter or one-half of the incoming signal frequency.

4. The method of claim 1, wherein the combined signal defines an average of the first, the second, the third and the fourth output signals.

5. The method of claim 1, further comprising synchronizing the first alpha signal and the second alpha signal.

6. The method of claim 1, further comprising processing the first alpha signal and the second alpha signal during different clock cycles.

7. The method of claim 1, further comprising processing the first alpha signal and the first beta signal during one clock cycle.

8. The method of claim 1, wherein the step of preserving the rising edge of the first signal further comprises changing signal amplitude of the first output signal when detecting a rising edge.

9. An apparatus for decomposing a high frequency multiphase signal to one or more low frequency data streams, the apparatus comprising:
   a first single-to-differential unit for decomposing a first phase of the multiphase signal to a first alpha signal and a first beta signal;
   a second single-to-differential unit for decomposing a second phase of the multiphase signal to a second alpha signal and a second beta signal;
   a first logic unit for processing the first alpha signal to a first output signal, the first output signal preserving a rising edge of the first phase of the multiphase signal;
   a second logic unit for processing the first beta signal to a second output signal, the second output signal preserving a falling edge of the first phase of the multiphase signal;

a third logic unit for processing the second alpha signal to a third output signal, the third output signal preserving a rising edge of the second phase of the multiphase signal; and a fourth logic unit for processing the second beta signal to a fourth output signal, the fourth output signal preserving a falling edge of the second phase of the multiphase signal.

10. The apparatus of claim 9, wherein the first logic unit reduces frequency of the first output signal to a fraction of the first phase of the multiphase signal.

11. The apparatus of claim 9, further comprising a combiner for combining the first, second, third and fourth output signals to form a combined signal.

12. The apparatus of claim 9, wherein the second beta signal is an inverse of the second alpha signal.

13. The apparatus of claim 9, further comprising a clock circuit for reclocking each of the first, second, third and fourth output signals.

14. The apparatus of claim 9, wherein the first logic unit defines a flip-flop.

15. The apparatus of claim 9, further comprising a third single-to differential unit for decomposing a third phase of the multiphase signal to a third alpha signal and a third beta signal.

16. The apparatus of claim 9, further comprising a threshold detector for detecting a change in at least one phase of the multiphase signal.

17. The apparatus of claim 9, wherein the first logic unit and the third logic unit operate synchronously.

18. The apparatus of claim 9, wherein the first logic unit and the third logic unit operate asynchronously.

19. A signal conversion system, comprising:
a plurality of decomposition circuits, each decomposition circuit decomposing one of a plurality of phases of a multiphase signal into one or more low frequency data streams;
a circuit for synchronizing each of the low frequency data streams with the pair of high frequency differential signals to form synchronized low speed data streams; and
a combiner circuit for combining the plurality of low speed data streams into an output signal, the output signal having a fraction of multiphase signal frequency;
wherein at least one of the decomposition circuits includes a plurality of circuit elements arranged in a multistage cascade for decomposing an incoming high frequency signal into a plurality of low speed data streams and the following relationship between the input signal's frequency ($F_{in}$) and an output frequency at each state ($F_{out}$) is $$F_{out} = (1/x)F_{in}$$

wherein x defines the number of logic elements at each stage.

20. The system of claim 19, further comprising at least one threshold detector for detecting a change in one of the plurality of phases of a multiphase signal.

21. The system of claim 19, further comprising a reference signal for clocking the plurality of decomposition circuits.

22. The system of claim 19, wherein the number of low speed data streams corresponds to the number of circuit elements in a last stage of the multistage cascade.

23. The system of claim 19, wherein at least one of the circuit elements defines one of a flip-flop or a shift register.

24. The system of claim 19, further comprising a single-to-differential circuit for decomposing a phase of the multiphase signal into a pair of differential signals.

25. The system of claim 19, wherein the number of the circuit elements in the decomposition circuit is $$\sum_{i=1}^{n} 2^i,$$

wherein n is the number of stages.

26. The system of claim 19, further comprising a clock circuit for reclocking the low speed data streams, and a logic circuit for extracting data from the reclocked low speed data streams reclocked by the clock circuit.

27. An RF transmitter system comprising:
a modulation circuit for modulating a digital signal with a digital carrier frequency to form a modulated input signal;
a frequency synthesizer for receiving the modulated input signal and providing a first signal;
a phase frequency detector for comparing the first signal with a measured frequency of a reference phase and producing an error phase signal;
a multiphase voltage-controlled oscillator for receiving the error phase signal and outputting a plurality of phase signals;
a plurality of direct RF to digital converters ("DrfDCs"), each of the plurality of the DrfDCs processing one of the plurality of phase signals and providing a respective output signal wherein each of the DrfDCs further comprise a multistage cascade of flip-flops for decomposing a high frequency signal into a plurality of low frequency signals and the relationship between an input signal's frequency ($F_{in}$) and an output frequency at each stage ($F_{out}$) can be summarized as:

$$F_{out} = (1/x)F_{in}$$

wherein x defines the number of logic elements at each stage; and
a summing circuit for combining the output signals from the plurality of the DrfDCs to form a combined signal, wherein the combined signal has a frequency which is a fraction of a frequency of the modulated input signal.

28. The system of claim 27, wherein the frequency of the combined signal is about half of the frequency of the modulated input signal.

29. The system of claim 27, further comprising a threshold detector.

* * * * *